(12) United States Patent
Qu et al.

(10) Patent No.: US 11,940,279 B2
(45) Date of Patent: Mar. 26, 2024

(54) SYSTEMS AND METHODS FOR POSITIONING

(71) Applicant: BEIJING VOYAGER TECHNOLOGY CO., LTD., Beijing (CN)

(72) Inventors: Xiaozhi Qu, Beijing (CN); Tingbo Hou, Mountain View, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 105 days.

(21) Appl. No.: 17/651,803

(22) Filed: Feb. 20, 2022

(65) Prior Publication Data

US 2022/0170749 A1 Jun. 2, 2022

Related U.S. Application Data

(63) Continuation of application No. PCT/CN2019/105025, filed on Sep. 10, 2019.

(51) Int. Cl.
*G01C 21/30* (2006.01)
*G01C 21/00* (2006.01)
(Continued)

(52) U.S. Cl.
CPC ......... *G01C 21/30* (2013.01); *G01C 21/3807* (2020.08); *G06T 7/74* (2017.01);
(Continued)

(58) Field of Classification Search
CPC .. G01C 21/30; G01C 21/3807; G01C 1/0274; G01C 2201/0212; G06T 7/74;
(Continued)

(56) References Cited

U.S. PATENT DOCUMENTS

6,005,984 A * 12/1999 Kawakami ............. G06V 10/48
382/276
6,055,477 A * 4/2000 McBurney ............... G01C 5/00
701/469
(Continued)

FOREIGN PATENT DOCUMENTS

CN 1841409 A 10/2006
CN 103700110 A 4/2014
(Continued)

OTHER PUBLICATIONS

English Translation for CN-107144285-A (Year: 2023).*
(Continued)

*Primary Examiner* — Mahmoud S Ismail
(74) *Attorney, Agent, or Firm* — METIS IP LLC

(57) ABSTRACT

The present disclosure is related to systems and methods for positioning. The method includes obtaining estimated pose data of a subject. The method also includes generating a local map associated with the estimated pose data. The method also includes obtaining, based on the estimated pose data, a reference map. The method also includes correlating the local map and the reference map in a frequency domain. The method further includes determining, based on the estimated pose data and the correlation between the local map and the reference map in the frequency domain, target pose data of the subject.

20 Claims, 15 Drawing Sheets

(51) Int. Cl.
*G06T 7/73* (2017.01)
*B60W 60/00* (2020.01)
*G05D 1/00* (2006.01)

(52) U.S. Cl.
CPC ....... *B60W 60/001* (2020.02); *B60W 2556/40* (2020.02); *G05D 1/0274* (2013.01); *G05D 2201/0212* (2013.01); *G06T 2207/30252* (2013.01)

(58) Field of Classification Search
CPC .... G06T 2207/30252; B60W 2556/40; B60W 60/001
USPC .......................................................... 701/446
See application file for complete search history.

(56) References Cited

U.S. PATENT DOCUMENTS

| | | | |
|---|---|---|---|
| 2010/0010741 A1 | 1/2010 | Tener et al. | |
| 2015/0016682 A1* | 1/2015 | Levy | A61N 7/02 |
| | | | 382/103 |
| 2018/0299557 A1 | 10/2018 | Yi et al. | |
| 2019/0079539 A1 | 3/2019 | Sridhar et al. | |
| 2023/0129620 A1* | 4/2023 | Kolagheichi-Ganjineh | G01C 21/3848 |
| | | | 382/103 |

FOREIGN PATENT DOCUMENTS

| | | | | |
|---|---|---|---|---|
| CN | 104463849 A | | 3/2015 | |
| CN | 107144285 A | * | 9/2017 | ............ G01C 21/20 |
| CN | 107144285 A | | 9/2017 | |
| WO | 2017128934 A1 | | 8/2017 | |
| WO | 2018115897 A1 | | 6/2018 | |
| WO | 2021007716 A1 | | 1/2021 | |

OTHER PUBLICATIONS

Zeng, Hui et al., Robot Self-Localization Based on Planar Laser Measurement, Acta Automatica Sinica, 33(2):138-144, 2007.
International Search Report in PCT/CN2019/105025 dated Jun. 2, 2020, 4 pages.
Written Opinion in PCT/CN2019/105025 dated Jun. 2, 2020, 4 pages.

* cited by examiner

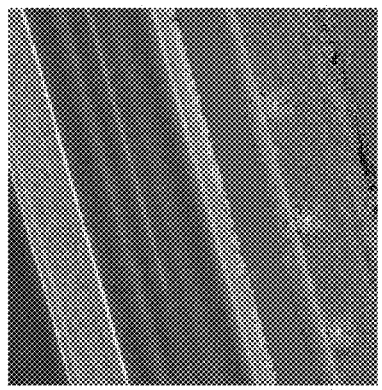
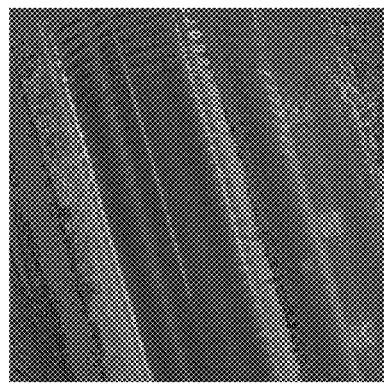
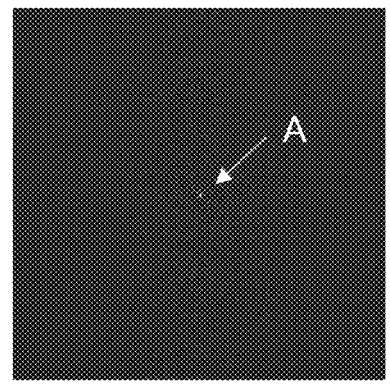
Reference Map 200×200         Local Map 200×200         Cross Power Spectrum
FIG. 11A                      FIG. 11B                  FIG. 11C Reference Map 200×200   Local Map 200×200   Cross Power Spectrum

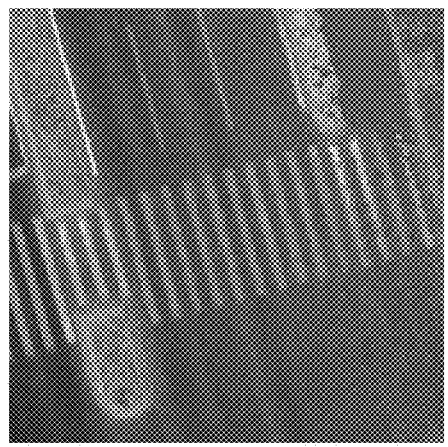 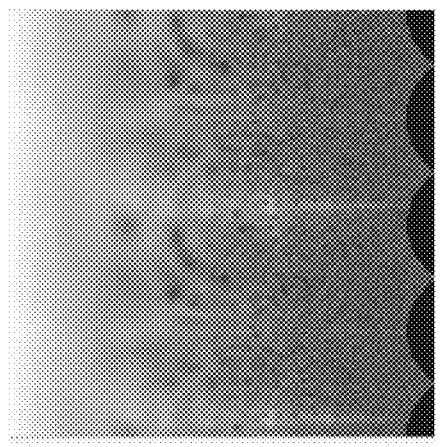
FIG. 13A  FIG. 13B

Original Image

Image B
Rotate 5.0 degrees
Result: 5.16336 degrees

Image C
Rotate 10.0 degrees
Result: 10.2197 degrees

Image D
Rotate 30.0 degrees
Result: 30.504 degrees

Image E
Rotate 90.0 degrees
Result: 89.9801 degrees

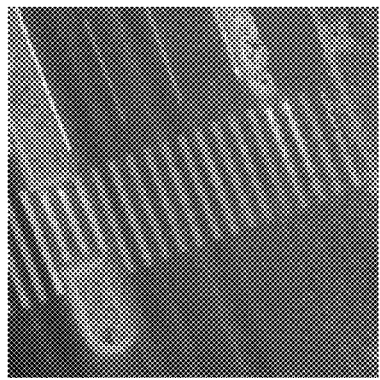
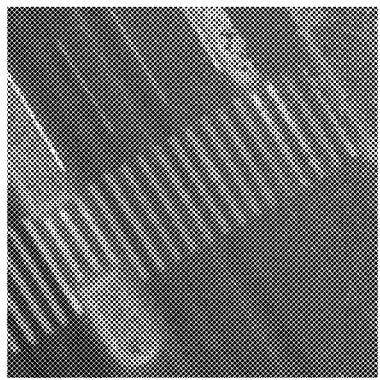
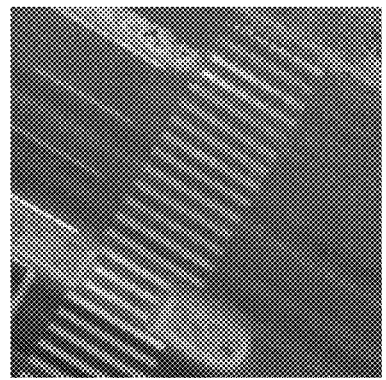
Image F
Rotate 5.0 degrees
Offset (5,5)
Result: 5.22457 degrees
(4.95259, 4.9668)
Image G
Rotate 15.0 degrees
Offset (5,5)
Result: 15.6433 degrees
(4.81576, 4.82327)
Image H
Rotate 45.0 degrees
Offset (5,5)
Result: 45.5752 degrees
(4.9156, 4.88809)
FIG. 15A
FIG. 15B
FIG. 15C

_US 11,940,279 B2_

SYSTEMS AND METHODS FOR POSITIONING

CROSS-REFERENCE TO RELATED APPLICATIONS

This application is a Continuation of International Application No. PCT/CN2019/105025, filed on Sep. 10, 2019, the entire contents of which are hereby incorporated by reference.

TECHNICAL FIELD

This present disclosure generally relates to systems and methods for positioning technology, and in particular, to systems and methods for determining target pose data of a subject in a map.

BACKGROUND

Positioning techniques are widely used in various fields, such as an autonomous driving system. For the autonomous driving system, it is important to determine a precise location of a subject (e.g., an autonomous vehicle) in a pre-built map (e.g., a high-definition map) and/or an orientation (e.g., a heading direction) of the subject during driving of the autonomous vehicle. In some scenarios, a location and/or an orientation of the autonomous vehicle may be determined by matching a local map generated by scanning data (e.g., point-cloud data) acquired by one or more sensors (e.g., a LiDAR) with the pre-built map. However, it is difficult to perform an accurate matching between the local map and the reference map due to a low texture and a high noise of the local map. Thus, it is desirable to develop effective systems and methods for determining an accurate location and orientation of a subject.

SUMMARY

According to an aspect of the present disclosure, a system for positioning may include at least one storage medium storing a set of instructions, and at least one processor in communication with the at least one storage medium. When executing the stored set of instructions, the at least one processor may cause the system to obtain estimated pose data of a subject. The at least one processor may also cause the system to generate a local map associated with the estimated pose data. The at least one processor may also cause the system to obtain, based on the estimated pose data, a reference map. The at least one processor may also cause the system to correlate the local map and the reference map in a frequency domain. The at least one processor may further cause the system to determine, based on the estimated pose data and the correlation between the local map and the reference map in the frequency domain, target pose data of the subject.

In some embodiments, the at least one processor may also cause the system to correlate the local map and the reference map in the frequency domain using a phase correlation technique.

In some embodiments, the estimated pose data may include at least one of an estimated location and an estimated orientation, and the target pose data of the subject includes at least one of a target location and a target orientation.

In some embodiments, the at least one processor may also cause the system to determine, based on the correlation between the local map and the reference map in the frequency domain, an offset between the local map and the reference map. The at least one processor may further cause the system to determine, based on the estimated location of the subject and the offset between the local map and the reference map, the target location in the reference map.

In some embodiments, the at least one processor may also cause the system to determine a cross power spectrum between the local map and the reference map in the frequency domain. The at least one processor may also cause the system to convert the cross power spectrum between the local map and the reference map in the frequency domain to a spatial domain. The at least one processor may further cause the system to determine, based on the cross power spectrum between the local map and the reference map in the spatial domain, the offset between the local map and the reference map.

In some embodiments, the at least one processor may also cause the system to determine a location corresponding to a peak of the cross power spectrum between the local map and the reference map in the spatial domain. The at least one processor may further cause the system to determine, based on the location corresponding to the peak of the cross power spectrum between the local map and the reference map in the spatial domain, the offset between the local map and the reference map.

In some embodiments, the at least one processor may also cause the system to determine a fitting curve by performing an interpolation operation on the cross power spectrum between the local map and the reference map in the spatial domain. The at least one processor may further cause the system to designate a location corresponding to a peak of the fitting curve as the offset between the local map and the reference map.

In some embodiments, the at least one processor may also cause the system to determine, based on the correlation between the local map and the reference map in the frequency domain, a rotation angle between the local map and the reference map. The at least one processor may further cause the system to determine, based on a reference orientation corresponding to the reference map and the rotation angle between the local map and the reference map, the target orientation in the reference map.

In some embodiments, the at least one processor may also cause the system to determine a geometric transformation relationship between the local map and the reference map in the frequency domain. The at least one processor may further cause the system to determine, based on the geometric transformation relationship between the local map and the reference map in the frequency domain, the rotation angle between the local map and the reference map.

In some embodiments, the at least one processor may also cause the system to perform a polar transformation on the local map and the reference map.

In some embodiments, the local map may include at least one of an intensity image or an elevation image.

In some embodiments, the reference map may include at least one of an intensity image or an elevation image.

According to another aspect of the present disclosure, a method may include one or more of the following operations performed by at least one processor. The method may include obtaining estimated pose data of a subject. The method may also include generating a local map associated with the estimated pose data. The method may also include obtaining, based on the estimated pose data, a reference map. The method may also include correlating the local map and the reference map in a frequency domain. The method may further include determining, based on the estimated pose data and the correlation between the local map and the reference map in the frequency domain, target pose data of the subject.

According to still another aspect of the present disclosure, a non-transitory computer readable medium may include at least one set of instructions for positioning. Wherein when executed by at least one processor, the at least one set of instructions may cause the at least one processor to perform a method. The method may include obtaining estimated pose data of a subject. The method may also include generating a local map associated with the estimated pose data. The method may also include obtaining, based on the estimated pose data, a reference map. The method may also include correlating the local map and the reference map in a frequency domain. The method may further include determining, based on the estimated pose data and the correlation between the local map and the reference map in the frequency domain, target pose data of the subject.

According to still another aspect of the present disclosure, a system for positioning may include an obtaining module, a generation module, a correlation module, and a determination module. The obtaining module may be configured to obtain estimated pose data of a subject. The generation module may be configured to generate a local map associated with the estimated pose data. The obtaining module may be configured to obtain, based on the estimated pose data, a reference map. The correlation module may be configured to correlate the local map and the reference map in a frequency domain. The determination module may be configured to determine, based on the estimated pose data and the correlation between the local map and the reference map in the frequency domain, target pose data of the subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 11A, 11B, and 11C are schematic diagrams illustrating a phase correlation for a local map and a reference map according to some embodiments of the present disclosure;

FIGS. 13A and 13B are schematic diagrams illustrating a polar transformation for an image according to some embodiments of the present disclosure;

FIGS. 15A-15C are schematic diagrams illustrating exemplary results of offsets and rotation angles between an original image and a plurality of images in the spatial domain according to some embodiments of the present disclosure.

DETAILED DESCRIPTION

Figure 1:
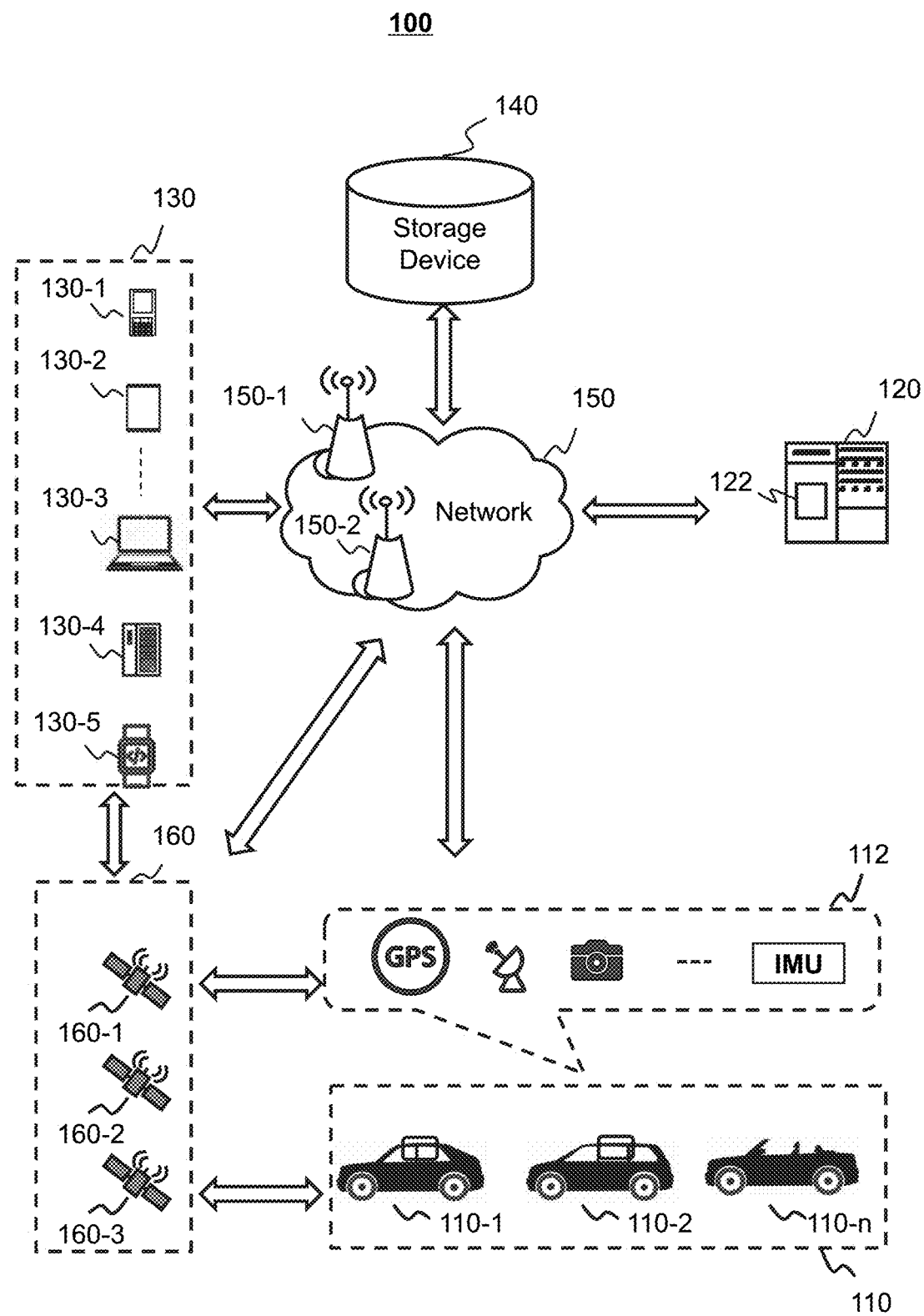
FIG. 1 is a schematic diagram illustrating an exemplary autonomous driving system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding positioning a subject (e.g., an autonomous vehicle) in an autonomous driving system, it should be understood that this is only one exemplary embodiment. The systems and methods of the present disclosure may be applied to any other kind of transportation system. For example, the systems and methods of the present disclosure may be applied to transportation systems of different environments including land, ocean, aerospace, or the like, or any combination thereof. The autonomous vehicle of the transportation systems may include a taxi, a private car, a hitch, a bus, a train, a bullet train, a high-speed rail, a subway, a vessel, an aircraft, a spaceship, a hot-air balloon, or the like, or any combination thereof.

An aspect of the present disclosure relates to systems and methods for positioning. To this end, the systems and methods may obtain estimated pose data (e.g., an estimated location and/or an estimated orientation) of a subject. The systems and methods may generate a local map associated with the estimated pose data. The systems and methods may obtain, based on the estimated pose data, a reference map. The systems and methods may correlate the local map and the reference map in a frequency domain. For example, the systems and methods may correlate the local map and the reference map in the frequency domain using a phase correlation technique. The systems and methods may determine, based on the estimated pose data and the correlation between the local map and the reference map in the frequency domain, target pose data (e.g., a target location and/or a target orientation) of the subject. Accordingly, the target pose data of the subject may be determined more accurately.

FIG. 1 is a schematic diagram illustrating an exemplary autonomous driving system 100 according to some embodiments of the present disclosure. In some embodiments, the autonomous driving system 100 may include one or more vehicles 110, a server 120, a terminal device 130, a storage device 140, a network 150, and a positioning and navigation system 160.

The vehicle(s) 110 may move. For example, the vehicle(s) 110 may carry a passenger and travel to a destination. The vehicles 110 may include a plurality of vehicles 110-1, 110-2 . . . 110-n. In some embodiments, the vehicles 110 may be any type of autonomous vehicles, unmanned aerial vehicles, etc. An autonomous vehicle and/or unmanned aerial vehicle may be capable of sensing its environment and navigating without human maneuvering. In some embodiments, the vehicle(s) 110 may include structures of a conventional vehicle, for example, a chassis, a suspension, a steering device (e.g., a steering wheel), a brake device (e.g., a brake pedal), an accelerator, etc. In some embodiments, the vehicle(s) 110 may be a survey vehicle configured to acquire data for constructing a high-definition map or 3-D city modeling (e.g., a reference map as described elsewhere in the present disclosure). It is contemplated that vehicle(s) 100 may be an electric vehicle, a fuel cell vehicle, a hybrid vehicle, a conventional internal combustion engine vehicle, etc. The vehicle(s) 110 may have a body and at least one wheel. The body may be any body style, such as a sports vehicle, a coupe, a sedan, a pick-up truck, a station wagon, a sports utility vehicle (SUV), a minivan, or a conversion van. In some embodiments, the vehicle(s) 110 may include a pair of front wheels and a pair of rear wheels. However, it is contemplated that the vehicle(s) 110 may have more or less wheels or equivalent structures that enable the vehicle(s) 110 to move around. The vehicle(s) 110 may be configured to be all wheel drive (AWD), front wheel drive (FWR), or rear wheel drive (RWD). In some embodiments, the vehicle(s) 110 may be configured to be operated by an operator occupying the vehicle, remotely controlled, and/or autonomous.

As illustrated in FIG. 1, the vehicle(s) 110 may be equipped with one or more sensors 112 mounted to the body of the vehicle(s) 110 via a mounting structure. The mounting structure may be an electro-mechanical device installed or otherwise attached to the body of the vehicle(s) 110. In some embodiments, the mounting structure may use screws, adhesives, or another mounting mechanism. The vehicle(s) 110 may be additionally equipped with the one or more sensors 112 inside or outside the body using any suitable mounting mechanisms.

The sensors 112 may include a GPS device, a light detection and ranging (LiDAR), a camera, an inertial measurement unit (IMU) sensor, or the like, or any combination thereof. The LiDAR may be configured to scan the surrounding and generate point-cloud data. The LiDAR may measure a distance to an object by illuminating the object with pulsed laser light and measuring the reflected pulses with a sensor. Differences in laser return times and wavelengths may then be used to make digital 3-D representations of the object. The light used for LiDAR scan may be ultraviolet, visible, near infrared, etc. Because a narrow laser beam may map physical features with very high resolution, the LiDAR may be particularly suitable for high-definition map surveys. The camera may be configured to obtain one or more images relating to objects (e.g., a person, an animal, a tree, a roadblock, a building, or a vehicle) that are within the scope of the camera. The GPS device may refer to a device that is capable of receiving geolocation and time information from GPS satellites and then to calculate the device's geographical position. The IMU sensor may refer to an electronic device that measures and provides a vehicle's specific force, angular rate, and sometimes the magnetic field surrounding the vehicle, using various inertial sensors, such as accelerometers and gyroscopes, sometimes also magnetometers. By combining the GPS device and the IMU sensor, the sensor 112 can provide real-time pose information of the vehicle(s) 110 as it travels, including the positions and orientations (e.g., Euler angles) of the vehicle(s) 110 at each time point. Consistent with the present disclosure, the sensors 112 may take measurements of pose information at the same time points where the sensors 112 captures the point cloud data. Accordingly, the pose information may be associated with the respective point cloud data. In some embodiments, the combination of a point cloud data and its associated pose information may be used to position the vehicle(s) 110.

In some embodiments, the server 120 may be a single server or a server group. The server group may be centralized or distributed (e.g., the server 120 may be a distributed system). In some embodiments, the server 120 may be local or remote. For example, the server 120 may access information and/or data stored in the terminal device 130, the sensors 112, the vehicle 110, the storage device 140, and/or the positioning and navigation system 160 via the network 150. As another example, the server 120 may be directly connected to the terminal device 130, the sensors 112, the vehicle 110, and/or the storage device 140 to access stored information and/or data. In some embodiments, the server 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 having one or more components illustrated in FIG. 2 in the present disclosure.

In some embodiments, the server 120 may include a processing engine 122. The processing engine 122 may process information and/or data associated with the vehicle 110 to perform one or more functions described in the present disclosure. For example, the processing engine 122 may obtain estimated pose data (e.g., an estimated location and/or an estimated orientation) of the vehicle 110. As another example, the processing engine 122 may generate a local map associated with estimated pose data of the vehicle 110 in a spatial domain. As still another example, the processing engine 122 may obtain, based on estimated pose data of the vehicle 110, a reference map in a spatial domain. As still another example, the processing engine 122 may correlate a local map and a reference map in a frequency domain. As still another example, the processing engine 122 may determine, based on estimated pose data of the vehicle 110 and a correlation between the local map and the reference map in the frequency domain, target pose data (e.g., a target location and/or a target orientation) of the vehicle(s) 110. In some embodiments, the processing engine 122 may include one or more processing engines (e.g., single-core processing engine(s) or multi-core processor(s)). Merely by way of example, the processing engine 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 120 may be connected to the network 150 to communicate with one or more components (e.g., the terminal device 130, the sensors 112, the vehicle 110, the storage device 140, and/or the positioning and navigation system 160) of the autonomous driving system 100. In some embodiments, the server 120 may be directly connected to or communicate with one or more components (e.g., the terminal device 130, the sensors 112, the vehicle 110, the storage device 140, and/or the positioning and navigation system 160) of the autonomous driving system 100. In some embodiments, the server 120 may be integrated in the vehicle 110. For example, the server 120 may be a computing device (e.g., a computer) installed in the vehicle 110.

In some embodiments, the terminal devices 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, the built-in device in the vehicle 130-4 may include an onboard computer, an onboard television, etc. In some embodiments, the server 120 may be integrated into the terminal device 130.

The storage device 140 may store data and/or instructions. In some embodiments, the storage device 140 may store data obtained from the terminal device 130, the sensors 112, the vehicle 110, the positioning and navigation system 160, the processing engine 122, and/or an external storage device. For example, the storage device 140 may store estimated pose data of the vehicle 110 received from the sensors 112 (e.g., a GPS device, an IMU sensor). As another example, the storage device 140 may store a local map generated by the processing engine 122. As still another example, the storage device 140 may store a reference map obtained from any other storage device. In some embodiments, the storage device 140 may store data and/or instructions that the server 120 may execute or use to perform exemplary methods described in the present disclosure. For example, the storage device 140 may store instructions that the processing engine 122 may execute or use to generate a local map associated with estimated pose data of the vehicle 110 in a spatial domain. As another example, the storage device 140 may store instructions that the processing engine 122 may execute or use to correlate the local map and a reference map in a frequency domain. As still another example, the storage device 140 may store instructions that the processing engine 122 may execute or use to determine, based on estimated pose data of the vehicle 110 and a correlation between the local map and the reference map in the frequency domain, target pose data of the vehicle 110.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components (e.g., the server 120, the terminal device 130, the sensors 112, the vehicle 110, and/or the positioning and navigation system 160) of the autonomous driving system 100. One or more components of the autonomous driving system 100 may access the data or instructions stored in the storage device 140 via the network 150. In some embodiments, the storage device 140 may be directly connected to or communicate with one or more components (e.g., the server 120, the terminal device 130, the sensors 112, the vehicle 110, and/or the positioning and navigation system 160) of the autonomous driving system 100. In some embodiments, the storage device 140 may be part of the server 120. In some embodiments, the storage device 140 may be integrated in the vehicle 110.

The network 150 may facilitate exchange of information and/or data. In some embodiments, one or more components (e.g., the server 120, the terminal device 130, the sensors 112, the vehicle 110, the storage device 140, or the positioning and navigation system 160) of the autonomous driving system 100 may send information and/or data to other component(s) of the autonomous driving system 100 via the network 150. For example, the server 120 may obtain/acquire estimated pose data of a subject (e.g., the vehicle 110) from the sensors 112 and/or the positioning and navigation system 160 via the network 150. As another example, the server 120 may obtain/acquire, based on estimated pose data of a subject (e.g., the vehicle 110), a reference map in a spatial domain from the storage device 140 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points (e.g., 150-1, 150-2), through which one or more components of the autonomous driving system 100 may be connected to the network 150 to exchange data and/or information.

The positioning and navigation system 160 may determine information associated with an object, for example, one or more of the terminal devices 130, the vehicle 110, etc. In some embodiments, the positioning and navigation system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The positioning and navigation system 160 may include one or more satellites, for example, a satellite 160-1, a satellite 160-2, and a satellite 160-3. The satellites 160-1 through 160-3 may determine the information mentioned above independently or jointly. The satellite positioning and navigation system 160 may send the information mentioned above to the network 150, the terminal device 130, or the vehicle 110 via wireless connections.

It should be noted that the autonomous driving system 100 is merely provided for the purposes of illustration, and is not intended to limit the scope of the present disclosure. For persons having ordinary skills in the art, multiple variations or modifications may be made under the teachings of the present disclosure. For example, the autonomous driving system 100 may further include a database, an information source, etc. As another example, the autonomous driving system 100 may be implemented on other devices to realize similar or different functions. In some embodiments, the GPS device may also be replaced by other positioning device, such as BeiDou. However, those variations and modifications do not depart from the scope of the present disclosure.

Figure 2:
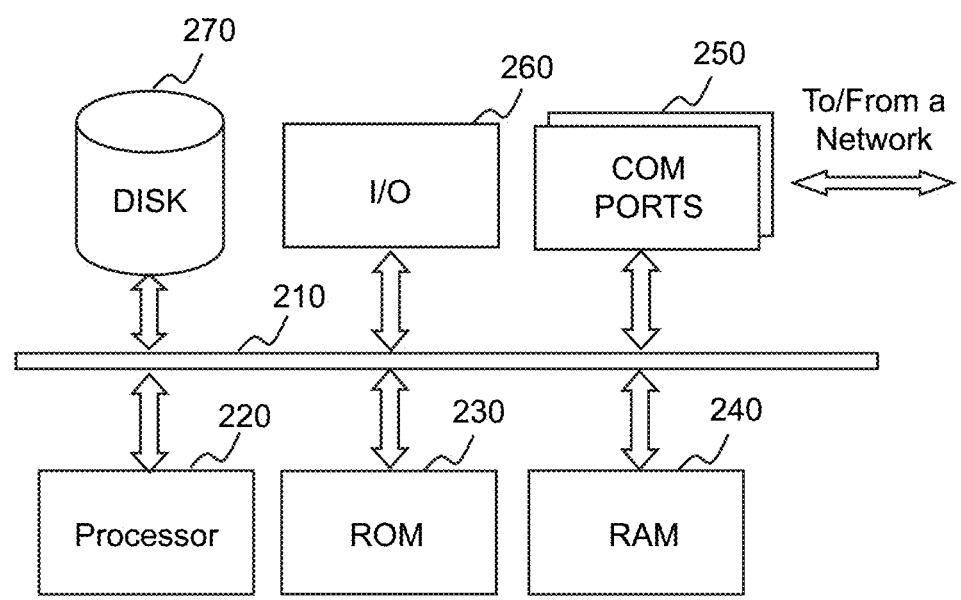
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 120 may be implemented on the computing device 200. For example, the processing engine 122 may be implemented on the computing device 200 and configured to perform functions of the processing engine 122 disclosed in this disclosure.

The computing device 200 may be used to implement any component of the autonomous driving system 100 of the present disclosure. For example, the processing engine 122 of the autonomous driving system 100 may be implemented on the computing device 200, via its hardware, software program, firmware, or a combination thereof. Although only one such computer is shown for convenience, the computer functions related to the autonomous driving system 100 as described herein may be implemented in a distributed manner on a number of similar platforms to distribute the processing load.

The computing device 200, for example, may include communication (COMM) ports 250 connected to and from a network (e.g., the network 150) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device 200 may further include program storage and data storage of different forms, for example, a disk 270, and a read only memory (ROM) 230, or a random access memory (RAM) 240, for various data files to be processed and/or transmitted by the computing device 200. The exemplary computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As another example, operation A and operation B may also be performed by two different processors jointly or separately in the computing device 200 (e.g., the first processor executes operation A and the second processor executes operation B, or the first and second processors jointly execute operations A and B).

Figure 3:
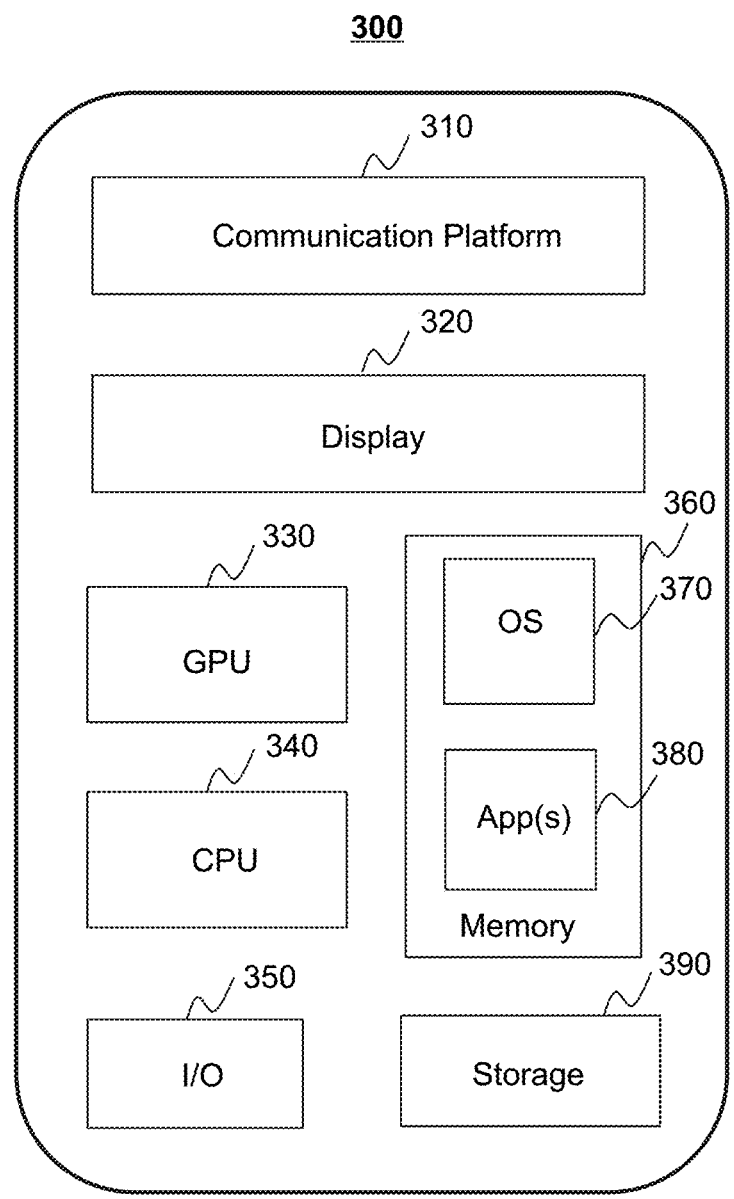
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device on which a terminal device may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to positioning or other information from the processing engine 122. User interactions with the information stream may be achieved via the I/O 350 and provided to the processing engine 122 and/or other components of the autonomous driving system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
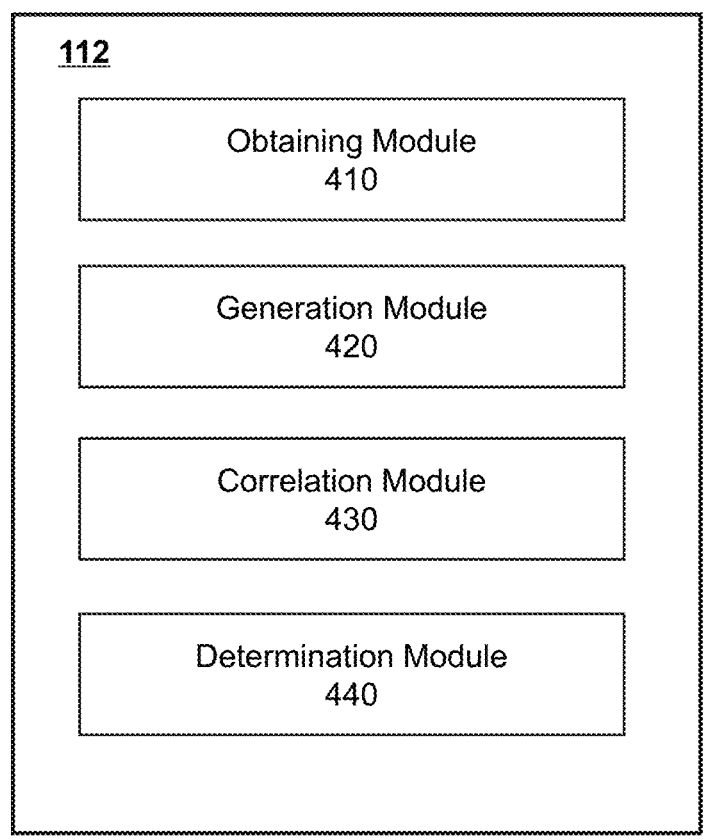
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 122 may include an obtaining module 410, a generation module 420, a correlation module 430, and a determination module 440.

The obtaining module 410 may be configured to obtain data and/or information associated with the autonomous driving system 100. For example, the obtaining module 410 may obtain estimated pose data (e.g., an estimated location and/or an estimated orientation) of a subject (e.g., an autonomous vehicle). As still another example, the obtaining module 410 may obtain a reference map based on estimated pose data of a subject.

The generation module 420 may be configured to generate data and/or information associated with the autonomous driving system 100. For example, the generation module 420 may generate a local map associated with estimated pose data of a subject in a spatial domain based on point-cloud data associated with the estimated pose data. More descriptions of the generation of a local map may be found elsewhere in the present disclosure (e.g., FIG. 5, and descriptions thereof).

The correlation module 430 may be configured to correlate data and/or information associated with the autonomous driving system 100. In some embodiments, the correlation module 430 may correlate a reference map and a local map in a frequency domain. For example, the processing engine 122 may correlate a local map and a reference map in a frequency domain using a phase correlation technique. As another example, the processing engine 122 may correlate a local map and a reference map in a frequency domain by determining a geometric transformation relationship between the local map and the reference map in the frequency domain. More descriptions of the correlation between the local map and the reference map in the frequency domain may be found elsewhere in the present disclosure (e.g., FIGS. 6, 7, and descriptions thereof).

The determination module 440 may be configured to determine data and/or information associated with the autonomous driving system 100. For example, the determination module 440 may determine a target location of a subject based on estimated location of the subject and an offset between a local map and a reference map in a spatial domain. More descriptions of the determination of the target location of the subject may be found elsewhere in the present disclosure (e.g., FIG. 6, and descriptions thereof). As another example, the determination module 440 may determine a target orientation of a subject based on an estimated orientation of the subject and a rotation angle between a local map and a reference map in a spatial domain. More descriptions of the determination of the target orientation of the subject may be found elsewhere in the present disclosure (e.g., FIG. 7, and descriptions thereof).

The modules in the processing engine 122 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, one or more modules may be added or omitted. For example, the processing engine 122 may further include a storage module (not shown) used to store information and/or data (e.g., a local map, a reference map) associated with the autonomous driving system 100. In some embodiments, one or more modules may be combined into a single module. For example, the correlation module 430 and the determination module 440 may be combined into a single module.

Figure 5:
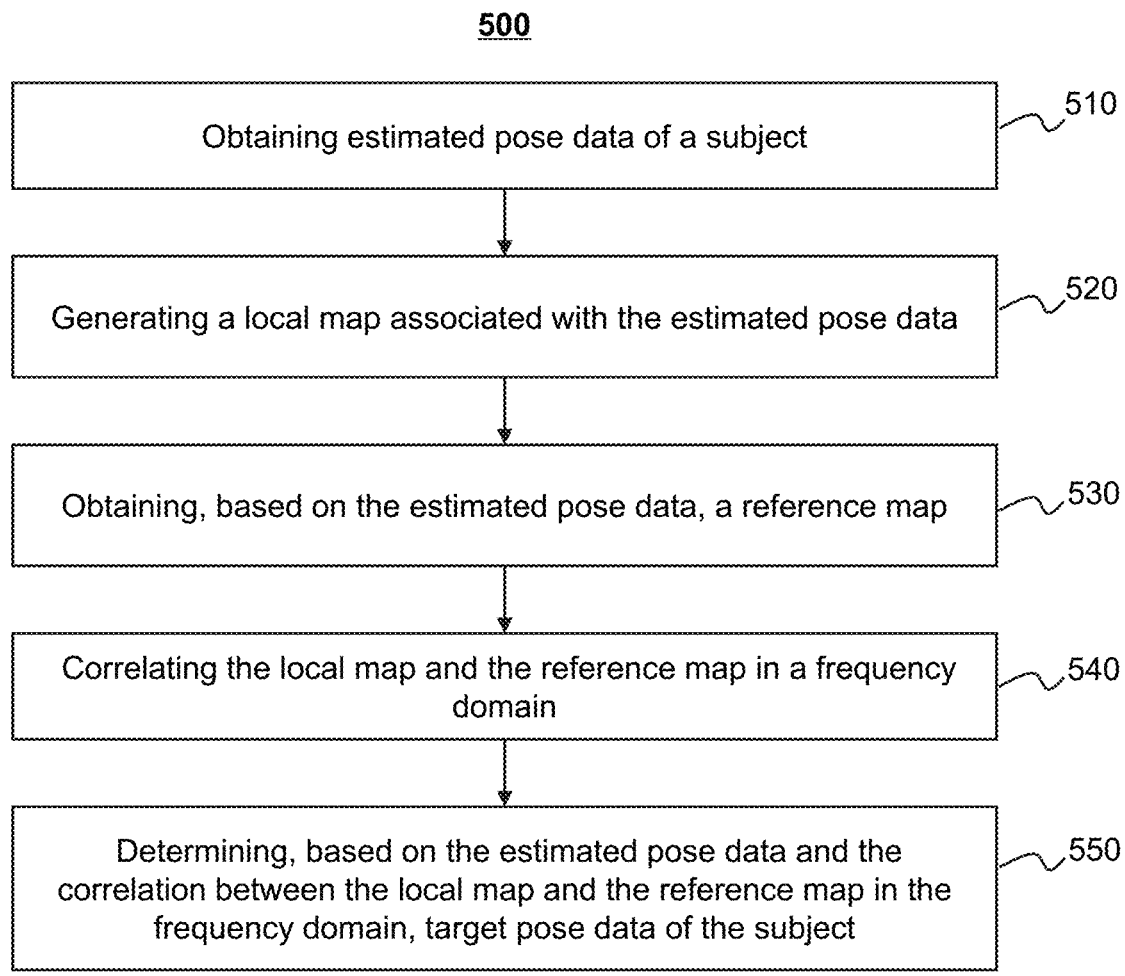
FIG. 5 is a flowchart illustrating an exemplary process for positioning a subject according to some embodiments of the present disclosure.

FIG. 5 is a flowchart illustrating an exemplary process for positioning a subject according to some embodiments of the present disclosure. The process 500 may be executed by the autonomous driving system 100. For example, the process 500 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In 510, the processing engine 122 (e.g., the obtaining module 410) may obtain estimated pose data of a subject.

The subject may be any composition of organic and/or inorganic matters that are with or without life and located on earth. For example, the subject may be an autonomous vehicle (e.g., the vehicle(s) 110), an unmanned aerial vehicle, etc., as described elsewhere in the present disclosure (FIG. 1, and descriptions thereof). In some embodiments, the estimated pose data of the subject may include an estimated location, an estimated orientation, or the like, or any combination thereof. In some embodiments, the estimated location of the subject may be a geographic location where the subject locates. The geographic location may be denoted by geographic coordinates (e.g., longitudinal and latitudinal coordinates) of the location. In some embodiments, the estimated orientation of the subject may be defined by a heading direction (also referred to as a yaw), a pitch, a roll, etc., of the subject. As used herein, a heading direction of a subject (e.g., the vehicle 110) may refer to a direction in which the nose of the subject (e.g., the head of a vehicle) points during a travel when measured in degrees clockwise from true north. That is, assuming that north is zero degree, the subject (e.g., the vehicle 110) may have positive heading in counter-clockwise direction and negative value in clockwise direction.

In some embodiments, the processing engine 122 may obtain the estimated pose data of the subject from one or more components of the autonomous driving system 100. For example, the subject may be associated with a sensor (e.g., the sensors 112) with positioning function, and the processing engine 122 may obtain the geographic coordinates of the subject from the sensor. As a further example, the processing engine 122 may obtain the geographic coordinates of the subject and/or the heading direction of the subject via a GPS device (e.g., a GPS receiver) and/or an inertial measurement unit (IMU) sensor mounted on the subject as described elsewhere in the present disclosure (e.g., FIG. 1, and descriptions thereof).

The processing engine 122 may continuously or periodically obtain the estimated pose data of the subject from the sensor (e.g., the GPS device, the IMU sensor). Additionally or alternatively, the sensor (e.g., the GPS device, the IMU sensor) may transmit the estimated pose data of the subject to a storage (e.g., the storage device 140) of the autonomous driving system 100 via the network 150 continuously or periodically. The processing engine 122 may access the storage and retrieve the estimated pose data of the subject.

In 520, the processing engine 122 (e.g., the generation module 420) may generate a local map associated with the estimated pose data.

As used herein, a local map may refer to a set of point-clouds in a region with the estimated location of the subject as the center. The shape of the region may be a regular triangle, a rectangle, a square, a regular hexagon, a circle, or the like. In some embodiments, the size of the region presented in the local map may be M meters×M meters. M may be any positive number, for example, 5, 10, 20, 50, 100, 500, etc. The local map may be presented as a two dimensional (2D) image, a three dimensional (3D) image, etc.

The processing engine 122 (e.g., the generation module 420) may generate the local map associated with the estimated pose data in the spatial domain based on point-cloud data associated with the estimated pose data. The point-cloud data may be generated by a sensor (e.g., LiDAR) via emitting laser pulses for scanning a space around the estimated location of the subject. The one or more sensors may include a LiDAR as described elsewhere in the present disclosure (e.g., FIG. 1, and descriptions thereof). For example, one or more LiDARs may be mounted on the subject (e.g., the vehicle 110) to send laser pulses to the earth's surface and/or surrounding objects (e.g., buildings, pedestrians, other vehicles). The laser may return back to the one or more LiDARs. The one or more LiDARs may generate point-cloud data based on received information. In some embodiments, as the subject (e.g., the vehicle 110) travels along a road, the one or more LiDARs mounted on the subject may rotate certain degrees (e.g., 120 degrees, 360 degrees) multiple times in a second to continuously generate the point-cloud data. In some embodiments, the processing engine 122 may obtain the point-cloud data associated with the estimated location from one or more sensors (e.g., the sensors 112) associated with the subject, and/or a storage (e.g., the storage device 140).

As used herein, the point-cloud data may refer to a set of data points associated with one or more objects in the space around the estimation location of the subject (e.g., a vehicle). A data point may correspond to at least one portion of the object. The one or more objects around the subject may include a lane mark, a building, a pedestrian, an animal, a plant, a vehicle, or the like. In some embodiments, the point-cloud data may have a plurality of attributes. The attribute of the point-cloud may include point-cloud coordinates (e.g., X, Y and Z coordinates) of each data point in a 3D point-cloud coordinate system, elevation information associated with each data point, intensity information associated with each data point, a return number, a total count of returns, a classification of each data point, a scan direction, or the like, or any combination thereof. As used herein, "elevation information associated with a data point" may refer to height of the data point above or below a fixed reference point, line or plane (e.g., most commonly a reference geoid, a mathematical model of the Earth's sea level as an equipotential gravitational surface). "Intensity information associated with a data point" may refer to return strength of the laser pulse emitted from the sensor (e.g., LiDAR) and reflected by the object for generating the data point. "Return number" may refer to the pulse return number for a given output laser pulse emitted from the sensor (e.g., LiDAR) and reflected by the object. In some embodiments, an emitted laser pulse may have various levels of returns depending on features it is reflected from and capabilities of the sensor (e.g., a laser scanner) used to collect the point-cloud data. For example, the first return may be flagged as return number one, the second as return number two, and so on. "The total count of returns" may refer to the total number of returns for a given pulse. "Classification of a data point" may refer to a type of data point (or the object) that has reflected the laser pulse. For example, the set of data points may be classified into a number of categories including bare earth or ground, a building, a person, water, etc. "Scan direction" may refer to the direction in which a scanning mirror in the LiDAR was directed when a data point was detected. In some embodiments, the local map may include an intensity image, an elevation image, or the like, or a combination thereof. As used herein, an intensity image of a local map may reflect intensity information of one or more objects presented in the point-cloud data. An elevation image of a local map may reflect elevation information of one or more objects presented in the point-cloud data. In some embodiments, the point-cloud data may include a plurality of point cloud frames. Each point cloud frame may correspond to a time point or a time period. As used herein, "a time point or a time period corresponding to a point cloud frame" may refer to the time when the LiDAR generates the point cloud frame.

The processing engine 122 may generate the local map associated with the estimated pose data of the subject in the spatial domain by registering and/or stitching the point-cloud data generated at different time points or periods. For example, the processing engine 122 may register and/or stitch a plurality of point cloud frames in the point-cloud data for generating the local map using a register technique. As used herein, "point cloud registration and/or stitching" may refer to a process of associating a plurality of point cloud frames into a common coordinate system. In some embodiments, the processing engine 122 may register and/or stitch a plurality of point cloud frames based on one or more point cloud registration algorithms. An exemplary point cloud registration algorithm may include an iterative closest point (ICP) algorithm, a robust point matching (RPM) algorithm, a Kernel correlation (KC) algorithm, a coherent point drift (CPD) algorithm, a sorting the correspondence space (SCS) algorithm, or the like.

The processing engine 122 may determine the local map based on the registered and/or stitched point cloud data. For example, the processing engine 122 may map the 3D registered and/or stitched point cloud data into a 2D local map with the estimated location of the subject as the center. The processing engine 122 may determine intensity information and/or elevation information associated with the local map based on the intensity information and/or elevation information associated with each data point of the point-cloud data and the geographic coordinates of the each data point. Exemplary techniques for generating a local map may be found in, for example, International Application PCT/CN2019/095816, entitled "SYSTEMS AND METHODS FOR POSITIONING" filed on Jul. 12, 2019, the contents of which are hereby incorporated by reference.

In 530, the processing engine 122 (e.g., the obtaining module 410) may obtain, based on the estimated pose data, a reference map.

As used herein, a specific reference map may present a plurality of attributes of objects as described elsewhere in the present disclosure in a specific space around a specific reference location. The specific reference location may be the center of the reference map. The geographic coordinates corresponding to the specific reference location or other locations of objects presented in the reference map may be pre-determined and stored in a storage (e.g., the storage device 140). In some embodiments, the local map may include a reference intensity image, a reference elevation image, or the like, or a combination thereof.

In some embodiments, the reference map may be generated off-line. For example, a vehicle (e.g., the vehicle(s) 110) may be dispatched for a survey trip to capture reference point-cloud data associated with estimation reference location of the vehicle for constructing the reference map. As the vehicle moves along a road, a plurality of sensors with high accuracy (e.g., LiDAR) installed in the vehicle (e.g., the vehicle(s) 110) may generate the reference point-cloud data of the surrounding scene around the vehicle. A processing engine (e.g., the processing engine 122) may generate a plurality of high-definition maps corresponding to different reference locations and store the plurality of definition maps in a storage device (e.g., the storage device 140). Each of the plurality of high-definition maps may correspond to a reference location. The processing engine 122 may access the storage device (e.g., the storage device 140) and retrieve a corresponding reference map from the plurality of high-definition maps based on the estimated location of the subject. For example, the processing engine 122 may determine a high-definition map from the storage device 140 that includes the estimated location of the subject as a center (i.e., the reference location of the high-definition map). As another example, the processing engine 122 may determine a high-definition map from the storage device 140 that includes the estimated location of the subject locating within a range from a center (i.e., the reference location of the high-definition map). In some embodiments, the generation of the reference map may be the same as or be different form the generation of the local map. For example, the reference map may be generated using one or more same or different point cloud registration algorithms with the local map. In some embodiments, the size of the reference map may be the same as or different from the size of the local map.

In 540, the processing engine 122 (e.g., the correlation module 430) may correlate the local map and the reference map in a frequency domain.

In some embodiments, the processing engine 122 may convert the local map and the reference map from the spatial domain into the frequency domain using an image transformation technique. Exemplary transformation techniques may include a Fourier transform, a discrete cosine transformation (DCT), etc. The processing engine 122 may then correlate the local map and the reference map in the frequency domain. For example, the processing engine 122 may correlate the local map and the reference map in the frequency domain using a phase correlation technique. As used herein, "phase correlation" may refer to an approach to estimate a relative translation offset between two similar images or other data sets. Further, the processing engine 122 may correlate the local map and the reference map in the frequency domain by determining a cross power spectrum between the local map and the reference map in the frequency domain. As another example, the processing engine 122 may correlate the local map and the reference map in the frequency domain by determining a geometric transformation relationship between the local map and the reference map in the frequency domain. In some embodiments, the processing engine 122 may correlate the local map and the reference map in the frequency domain by determining a geometric transformation relationship between the local map and the reference map in the spatial domain. Then processing engine 122 may correlate the local map and the reference map in the frequency domain by converting the geometric transformation relationship between the local map and the reference map in the spatial domain into the frequency domain. More descriptions of the correlation between the local map and the reference map in the frequency domain may be found elsewhere in the present disclosure (e.g., FIGS. 6, 7, and descriptions thereof).

In 550, the processing engine 122 (e.g., the determination module 440) may determine, based on the estimated pose data and the correlation between the local map and the reference map in the frequency domain, target pose data of the subject.

The target pose data of the subject may include a target location, a target orientation, or the like, or any combination thereof. In some embodiments, the processing engine 122 may determine the target location based on the estimation location and an offset between the local map and the reference map in the spatial domain. For example, the processing engine 122 may determine the target location by adding the estimation location and the offset between the local map and the reference map in the spatial domain. As used herein, the offset between the local map and the reference map in the spatial domain may refer to a deviant between two corresponding pixels in the local map and the reference map respectively. The two corresponding pixels in the local map and the reference map may correspond to a same point and/or portion of an object presented in the local map and the reference map, respectively. The processing engine 122 may determine the offset between the local map and the reference map in the spatial domain based on the correlation between the local map and the reference map in the frequency domain (e.g., the cross power spectrum). More descriptions of the determination of the target location of the subject may be found elsewhere in the present disclosure (e.g., FIG. 6, and descriptions thereof). In some embodiments, the processing engine 122 may determine the target orientation of the subject based on a reference orientation corresponding to the reference map and a rotation angle between the local map and the reference map in the spatial domain. As used herein, the reference orientation corresponding to the reference map may refer to an orientation of a vehicle (e.g., a survey vehicle) when the vehicle is configured to obtain reference point-cloud data for constructing the reference map. For example, the processing engine 122 may determine the target orientation by adding the reference orientation corresponding to the reference map and the rotation angle between the local map and the reference map in the spatial domain. As another example, the processing engine 122 may update the estimated orientation using the target orientation. The processing engine 122 may determine the rotation angle between the local map and the reference map in the spatial domain based on the correlation between the local map and the reference map in the frequency domain (e.g., the geometric transformation relationship). More descriptions of the determination of the target orientation of the subject may be found elsewhere in the present disclosure (e.g., FIG. 7, and descriptions thereof). In some embodiments, the processing engine 122 may determine the offset between the local map and the reference map in the spatial domain based on the rotation angle between the local map and the reference map in the spatial domain. For example, the processing engine 122 may determine the offset between the local map and the reference map in the spatial domain based on the rotation angle between the local map and the reference map in the spatial domain and the geometric transformation relationship between the local map and the reference map in the spatial domain.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 500. For example, a storing operation may be added in process 500. In the storing operation, the processing engine 122 may store information and/or data associated with the local map and/or the reference map in a storage (e.g., the storage device 140) disclosed elsewhere in the present disclosure. As another example, a preprocessing operation and/or a post-processing operation may be added before operation 540. The processing engine 122 may perform a preprocessing operation on the point-cloud data (and/or the reference point-cloud data) and generate the local map (and/or the reference map) based on the preprocessed point-cloud data (and/or the reference point-cloud data), and/or perform a post-processing operation on the local map (and/or the reference map). Exemplary preprocessing operations and/or the post-processing operation may include a denoising operation, remove of movement objects, a calibration of the point-cloud data (e.g., calibration of intensity information in the point-cloud data), etc. In some embodiments, the order of the operations in process 500 may be changed. For example, operation 530 may be performed before operation 520.

Figure 6:
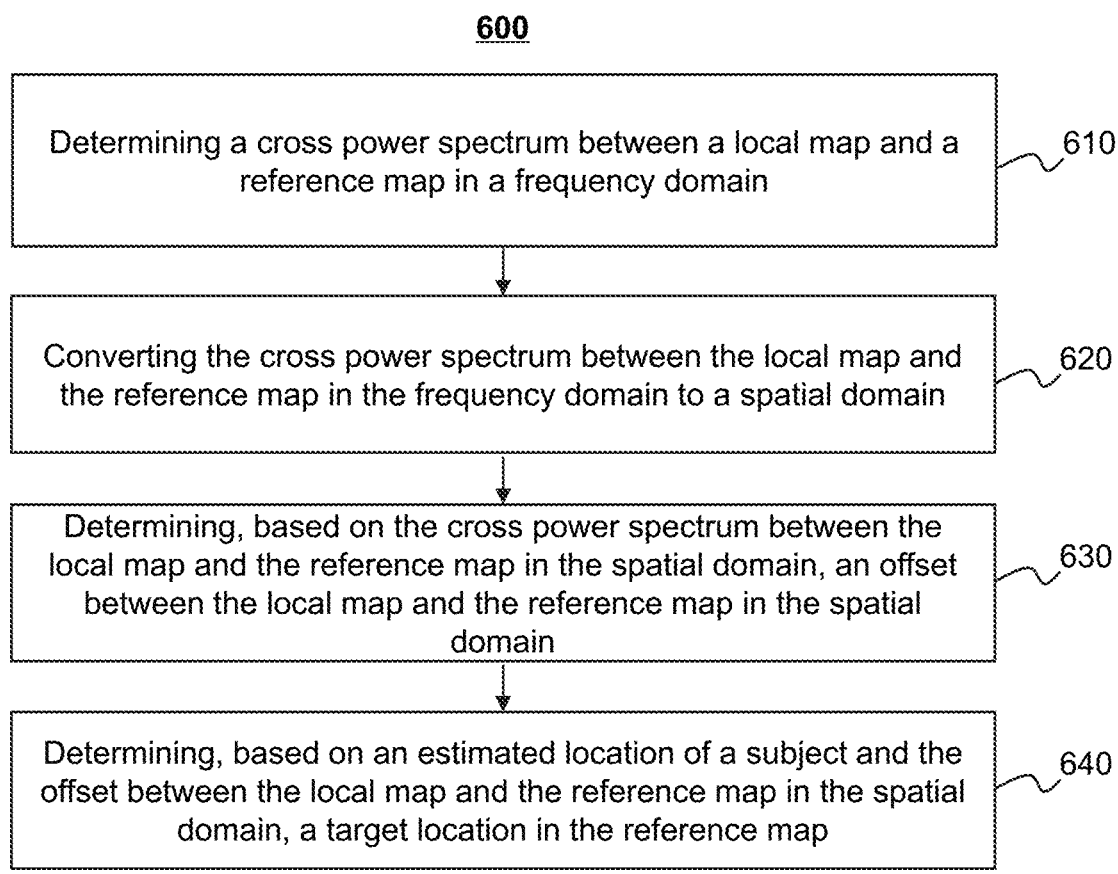
FIG. 6 is a flowchart illustrating an exemplary process for determining a target location of a subject according to some embodiments of the present disclosure.

FIG. 6 is a flowchart illustrating an exemplary process for determining a target location of a subject according to some embodiments of the present disclosure. The process 600 may be executed by the autonomous driving system 100. For example, the process 600 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting.

In 610, the processing engine 122 (e.g., the correlation module 430) may determine a cross power spectrum between a local map and a reference map in a frequency domain.

The local map and/or the reference map in a spatial domain may be obtained as described in connection with operations 510 to 530 illustrated in FIG. 5. The local map may be denoted by an intensity image, an evaluation image, or the like, or a combination thereof. The reference map may be denoted by a reference intensity image, a reference evaluation image, or the like, or a combination thereof. In some embodiments, the size of the local map may be the same as the size of the reference map in the spatial domain. In some embodiments, the processing engine 122 may convert the local map and the reference map from the spatial domain to the frequency domain. For example, the processing engine 122 may convert the local map and the reference map from the spatial domain to the frequency domain by performing a Fourier Transform (FT) on the local map and the reference map in the spatial domain. The Fourier Transform may include a discrete Fourier Transform (DFT), a fast Fourier Transform (FFT), etc.

The processing engine 122 may determine the cross power spectrum between the local map and the reference map in the frequency domain. The cross power spectrum between the local map and the reference map may reflect differences between magnitude and phase components of the local image and the reference image in the frequency domain. In some embodiments, the local map and the reference map may be two images that differ by a translation (also referred to as an offset) $(x_0, y_0)$, that is, the reference map may be determined by performing a translation operation $(x_0, y_0)$ on the local map. The local map and the reference map in the spatial domain may satisfy Equation (1):

$$f'(x,y)=f(x-x_0,y-y_0) \qquad (1),$$

where f'(x, y) refers to the reference map in the spatial domain; f(x, y) refers to the local map in the spatial domain; $x_0$ refers to a translation in a X-axis direction between the local map and the reference map in the spatial domain; and $y_0$ refers to a translation in a Y-axis direction between the local map and the reference map in the spatial domain. After the processing engine 122 performs the Fourier Transform on the local map and the reference map, the local map and the reference map in the frequency domain may satisfy Equation (2):

$$F'(\xi,\eta)=e^{-j2\pi(\xi x_0+\eta y_0)} * F(\xi,\eta) \qquad (2),$$

where $F(\xi, \eta)$ refers to the local map in the frequency domain; $F'(\xi, \eta)$ refers to the reference map in the frequency domain; $x_0$ and $y_0$ refers to the offset between the local map and the reference map in the spatial domain. In some embodiments, the cross power spectrum between the local map and the reference map in the frequency domain may be determined according to Equation (3):

$$H(\xi, \eta) = \frac{F(\xi, \eta)F'^*(\xi, \eta)}{|F(\xi, \eta)F'(\xi, \eta)|} = e^{j2\pi(\xi x_0+\eta y_0)}, \qquad (3)$$

where $H(\xi, \eta)$ refers to the cross power spectrum between the local map and the reference map in the frequency domain; $F(\xi, \eta)$ refers to the local map in the frequency domain; $F'(\xi, \eta)$ refers to the reference map in the frequency domain; $F'^*(\xi, \eta)$ refers to a complex conjugate of $F'(\xi, \eta)$; $x_0$ and $y_0$ refers to the offset between the local map and the reference map in the spatial domain.

In 620, the processing engine 122 (e.g., the correlation module 430) may convert the cross power spectrum between the local map and the reference map in the frequency domain to the spatial domain.

In some embodiments, the processing engine 122 may convert the cross power spectrum between the local map and the reference map in the frequency domain to the spatial domain by performing an inverse Fourier Transform (e.g., DFT) on the cross power spectrum between the local map and the reference map in the frequency domain.

In 630, the processing engine 122 (e.g., the correlation module 430) may determine, based on the cross power spectrum between the local map and the reference map in the spatial domain, an offset between the local map and the reference map in the spatial domain.

In some embodiments, the cross power spectrum between the local map and the reference map in the spatial domain may be an impulse function (also referred to as a delta function) with a response peak value. The processing engine 122 may determine a location (e.g., an X value and a Y value) corresponding to the response peak value of the impulse function. The processing engine 122 may determine the offset $(x_0, y_0)$ between the local map and the reference map in the spatial domain based on the location corresponding to the response peak value of the impulse function. In some embodiments, the processing engine 122 may desig-nate the location (e.g., X value and Y value) corresponding to the response peak value of the impulse function as the offset $(x_0, y_0)$ between the local map and the reference map in the spatial domain. In some embodiments, the processing engine 122 may determine a sub-pixel location around the location corresponding to the response peak value of the impulse function. The processing engine 122 may designate the sub-pixel location as the offset $(x_0, y_0)$ between the local map and the reference map in the spatial domain.

For example, the processing engine 122 may further determine the sub-pixel location around the location corresponding to the response peak value of the impulse function by performing an interpolation operation (e.g., a Gaussian interpolation, a polynomial interpolation, etc.) on the cross power spectrum between the local map and the reference map in the spatial domain. As a further example, the processing engine 122 may determine a window with the location corresponding to the response peak value of the impulse function as the center in the cross power spectrum between the local map and the reference map in the spatial domain. The size of the window may be set manually by a user, or be determined by one or more components of the autonomous driving system 100 according to default settings. For example, the size of the window may be 3 pixels×3 pixels. The processing engine 122 may determine a plurality of sub-pixel locations in the window. The number of the plurality of sub-pixel locations may be set manually by a user, or be determined by one or more components of the autonomous driving system 100 according to default settings. For example, the plurality of locations may be all of the sub-pixels in the window generated after the interpolation operation on the cross power spectrum between the local map and the reference map in the spatial domain. The processing engine 122 may fit the attribute information (e.g., an intensity value, an elevation value, a grayscale value) of the plurality of sub-pixel locations according to an interpolation technique (e.g., a Gaussian interpolation, a polynomial interpolation). The processing engine 122 may determine a sub-pixel location corresponding to a peak of a fitting curve as the offset between the local map and the reference map in the spatial domain.

In 640, the processing engine 122 (e.g., the determination module 440) may determine, based on an estimated location of a subject and the offset between the local map and the reference map in the spatial domain, a target location in the reference map.

In some embodiments, the processing engine 122 may determine the target location of the subject in the reference map based on the estimated location of the subject in the local map and the offset between the local map and the reference map in the spatial domain. For example, assuming that the estimated location of the subject in the local map is $(x_1, y_1)$ denoted by an image coordinate system. The offset is $(x_0, y_0)$ denoted by the image coordinate system, the processing engine 122 may determine that the target location of the subject in the reference map may be $(x_1+x_0, y_1+y_0)$ denoted by the image coordinate system.

In some embodiments, geographic coordinates of each of a plurality of locations in the reference map may be pre-determined. The processing engine 122 may obtain the geographic coordinates of the target location in the reference map from a storage (e.g., the storage device 140). In some embodiments, the processing engine 122 may transform the target location of the subject in the reference map denoted by the image coordinate system to a geographic location of the subject in a geographic coordinate system. In the geographic coordinate system, a position of a geographic location on the earth's surface may be represented by a latitude coordinate and a longitude coordinate. In some embodiments, a transformation relationship between the image system coordinate and the geographic coordinate system may be stored in a storage device of the autonomous driving system 100. Coordinates of each of a plurality of locations in the reference map may be transformed into latitude and longitude coordinates of the each of the plurality of locations based on the transformation relationship between the image system coordinate and the geographic coordinate system.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600. In the storing operation, the processing engine 122 may store information and/or data associated with the local map and the reference map (e.g., the local map in the spatial domain, the local map in the frequency domain, the reference map in the spatial domain, the reference map in the frequency domain, the cross power spectrum between the local map and the reference map in the frequency domain and/or the spatial domain) in a storage (e.g., the storage device 140) disclosed elsewhere in the present disclosure.

In some embodiments, the processing engine 122 may determine whether the response peak value of the impulse function is greater than a preset threshold. In response to a determination that the response peak value of the impulse function is greater than the preset threshold, the processing engine 122 may execute the process 600 to operation 640 to determine the target location in the reference map based on the estimated location of the subject and the offset between the local map and the reference map in the spatial domain. In response to a determination that the response peak value of the impulse function is not greater than the preset threshold, the processing engine 122 may execute the process 600 to proceed to operation 610 to determine a cross power spectrum between the local map and another reference map in the frequency domain until the response peak value of the impulse function is greater than the preset threshold. The preset threshold may be set manually by a user, or be determined by one or more components of the autonomous driving system 100 according to default settings.

Figure 7:
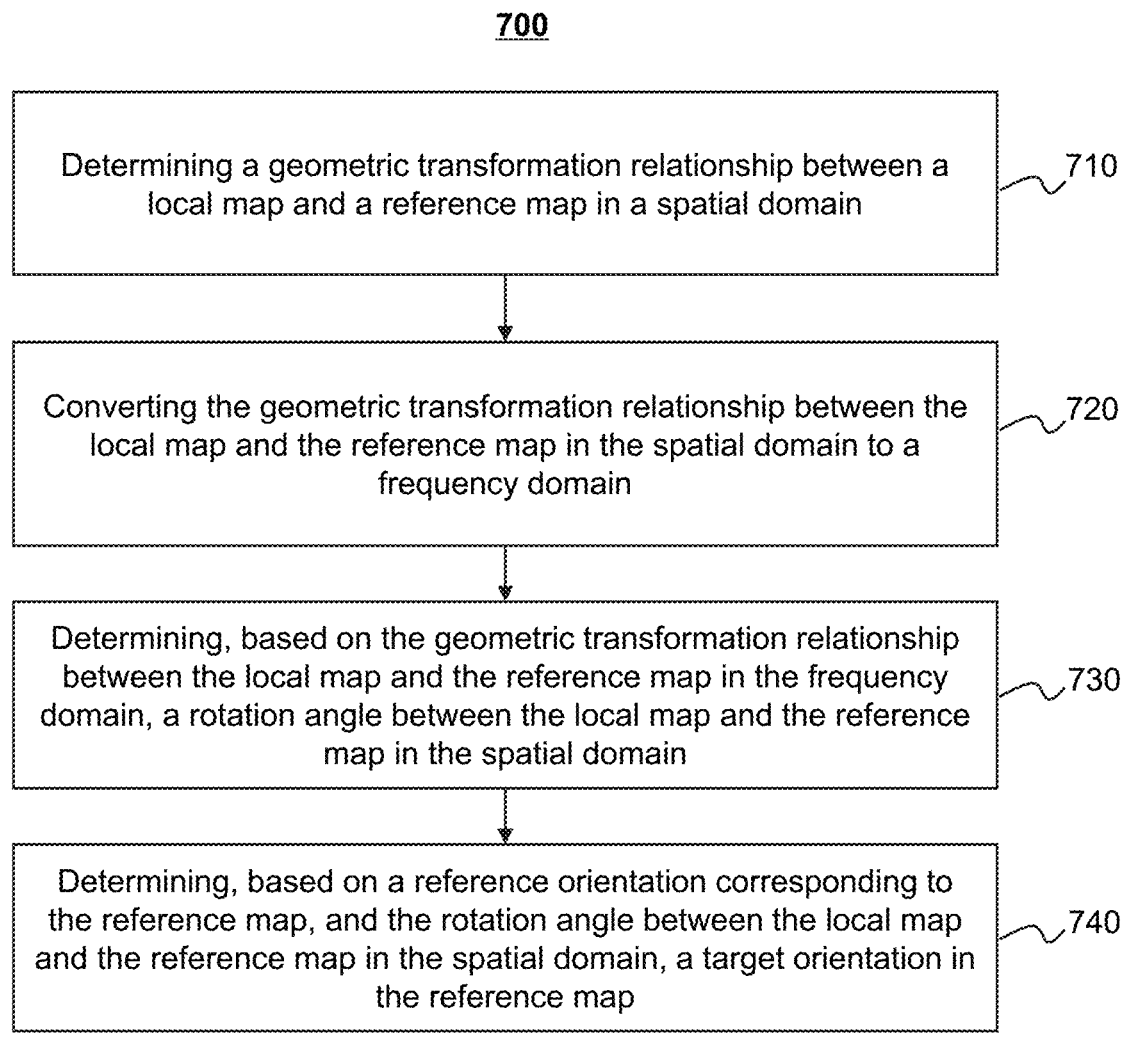
FIG. 7 is a flowchart illustrating an exemplary process for determining a target orientation of a subject according to some embodiments of the present disclosure.

FIG. 7 is a flowchart illustrating an exemplary process for determining a target orientation of a subject according to some embodiments of the present disclosure. The process 700 may be executed by the autonomous driving system 100. For example, the process 700 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 as illustrated in FIG. 7 and described below is not intended to be limiting.

In 710, the processing engine 122 (e.g., the correlation module 430) may determine a geometric transformation relationship between a local map and a reference map in a spatial domain. The local map and/or the reference map in a spatial domain may be obtained as described in connection with operations 510 to 530 illustrated in FIG. 5. The geometric transformation relationship between the local map and the reference map in the spatial domain may also referred to as a correlation between the local map and the reference map in the spatial domain.

In some embodiments, assuming that the reference map is a translated and rotated replica of the local map with a translation $(x_0, y_0)$ and a rotation $\theta_0$, the local map and the reference map in the spatial domain may satisfy Equation (4) that denotes the geometric transformation relationship between the local map and the reference map as follow:

$$f'(x,y)=f(x \cos \theta_0 + y \sin \theta_0 - x_0, -x \sin \theta_0 + y \cos \theta_0 - y_0) \quad (4),$$

where $f'(x, y)$ refers to the reference map in the spatial domain; $f(x, y)$ refers to the local map in the spatial domain; $x_0$ refers to a translation in a X-axis direction between the local map and the reference map in the spatial domain; $y_0$ refers to a translation in a Y-axis direction between the local map and the reference map in the spatial domain; and $\theta_0$ refers to a rotation angle between the local map and the reference map in the spatial domain.

In 720, the processing engine 122 (e.g., the correlation module 430) may convert the geometric transformation relationship between the local map and the reference map in the spatial domain to a frequency domain.

The processing engine 122 may determine the geometric transformation relationship between the local map and the reference map in the frequency domain by performing a Fourier Transform on the local map and the reference map in the spatial domain to convert the local map and the reference map into the frequency domain. The local map and the reference map in the frequency domain may satisfy Equation (5):

$$F'(\xi,\eta)=e^{-j2\pi(\xi x_0+\eta y_0)}*F(\xi \cos \theta_0+\eta \sin \theta_0,-\xi \sin \theta_0+\eta \cos \theta_0) \quad (5),$$

where $F'(\xi, \eta)$ refers to the reference map in the frequency domain; $F(\xi, \eta)$ refers to the local map in the frequency domain; $x_0$ refers to the translation in the X-axis direction between the local map and the reference map in the spatial domain; $y_0$ refers to the translation in the Y-axis direction between the local map and the reference map in the spatial domain; and $\theta_0$ refers to the rotation angle between the local map and the reference map in the spatial domain. In some embodiments, assuming that $M_1$ and $M_2$ are magnitudes of the local map in the frequency domain and the reference map in the frequency domain, respectively, after performing the inverse Fourier Transform (e.g., DFT) on the local map and the reference map in the frequency domain, Equation (5) may be represented as Equation (6):

$$M_2(\xi,\eta)=M_1(\xi \cos \theta_0+\eta \sin \theta_0,-\xi \sin \theta_0+\eta \cos \theta_0) \quad (6),$$

where $M_1$ refers to the magnitude of the local map in the frequency domain; $M_2$ refers to the magnitude of the reference map in the frequency domain; and $\theta_0$ refers to the rotation angle between the local map and the reference map in the spatial domain.

In some embodiments, the processing engine 122 may perform a polar transformation on $M_1$ and $M_2$, according to Equation (7):

$$M_1(\rho,\theta)=M_2(\rho,\theta-\theta_0) \quad (7),$$

where $M_1$ refers to the magnitude of the local map in the frequency domain; $M_2$ refers to the magnitude of the reference map in the frequency domain; and $\theta_0$ refers to the rotation angle between the local map and the reference map in the spatial domain. As used herein, a polar coordinate system may refer to a two-dimensional coordinate system in which each point on a plane is determined by a distance from a reference point and an angle from a reference direction.

In 730, the processing engine 122 (e.g., the correlation module 430) may determine, based on the geometric transformation relationship between the local map and the reference map in the frequency domain, a rotation angle between the local map and the reference map in the spatial domain.

In some embodiments, the processing engine 122 may correlate the magnitude of the reference map in the frequency domain (e.g., $M_2$) and the magnitude of the local map in the frequency domain (e.g., $M_1$), based on a phase correlation technique, as described in connection with operations 610, 620, and 630. For example, the processing engine 122 may determine a cross power spectrum between the $M_1$ and $M_2$ in the frequency domain. The processing engine 122 may convert the cross power spectrum between the $M_1$ and $M_2$ in the frequency domain to the spatial domain. The processing engine 122 may determine an offset between $M_1$ and $M_2$ in the polar coordinate system based on the cross power spectrum between the $M_1$ and $M_2$ in the spatial domain. The offset between $M_1$ and $M_2$ in the polar coordinate system may be the rotation angle $\theta_0$ between the local map and the reference map in the polar coordinate system. The processing engine 122 may determine the rotation angle $\theta_0$ between the local map and the reference map in the spatial domain by performing an inverse polar transformation on the rotation angle $\theta_0$ between the local map and the reference map in the polar coordinate system.

In 740, the processing engine 122 (e.g., the determination module 440) may determine, based on a reference orientation corresponding to the reference map, and the rotation angle between the local map and the reference map in the spatial domain, a target orientation in the reference map.

In some embodiments, the processing engine 122 may determine the target orientation of the subject based on the reference orientation corresponding to the reference map and the rotation angle between the local map and the reference map in the spatial domain. For example, assuming that the reference orientation of the subject corresponding to the reference map is $\theta_1$, and the rotation angle between the local map and the reference map in the spatial domain is $\theta_0$, the processing engine 122 may determine that the target orientation of the subject may be ($\theta_1+\theta_0$).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700. In the storing operation, the processing engine 122 may store information and/or data associated with the local map and the reference map (e.g., the geometric transformation relationship between the local map and the reference map in the frequency domain and/or the spatial domain) in a storage (e.g., the storage device 140) disclosed elsewhere in the present disclosure. In some embodiments, the processing engine 122 (e.g., the correlation module 430) may perform a polar transformation on the local map and the reference map to convert the local map and the reference map in an image coordinate system to a polar coordinate system. The processing engine 122 (e.g., the correlation module 430) may determine the geometric transformation relationship in the polar coordinate system between the local map and the reference map in the spatial domain.

Figure 8:
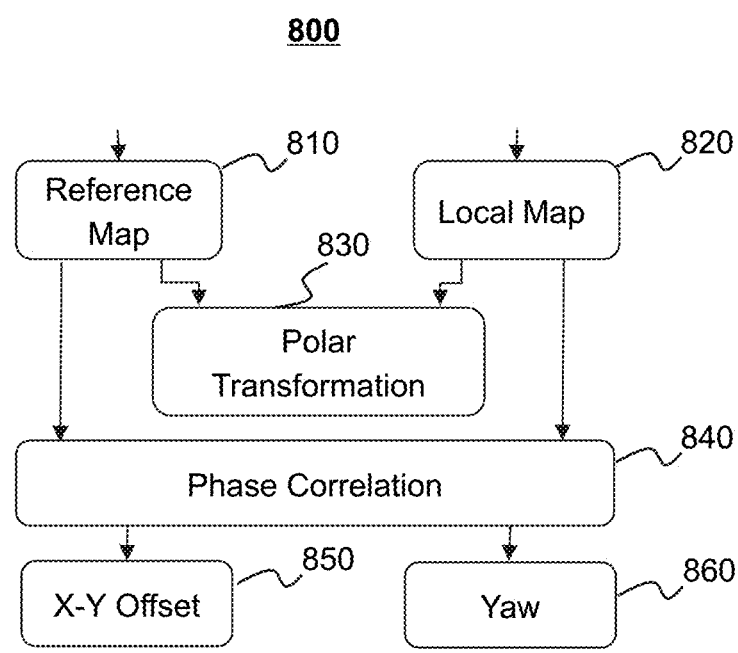
FIG. 8 is a schematic diagram illustrating an exemplary process for determining target pose data of a subject according to some embodiments of the present disclosure.

FIG. 8 is a schematic diagram illustrating an exemplary process 800 for determining target pose data of a subject according to some embodiments of the present disclosure. In some embodiments, process 800 may illustrate the process for determining the target pose data (e.g., a target location, a target orientation) of the subject (e.g., the vehicle 110) in combination with process 500 in FIG. 5, process 600 in FIG. 6, and process 700 in FIG. 7. As shown in FIG. 8, in 810, the processing engine 122 may obtain a reference map associated with estimated pose data of the subject in a spatial domain as described in connection with operation 530. The reference map may include an intensity image and/or an elevation image. In 820, the processing engine 122 may generate a local map associated with the estimated pose data of the subject in the spatial domain as described in connection with operation 520. The local map may include an intensity image and/or an elevation image. In 830, the processing engine 122 may perform a polar transformation on the reference map and/or the local map as described in connection with operations 720 and 730. In 840, the processing engine 122 may correlate the local map and the reference map in a frequency domain as described in connection with operation 540. For example, the processing engine 112 may correlate the local map and the reference map in the frequency domain by using a phase correlation technique. In 850, the processing engine 122 may determine an X-Y offset between the local map and the reference map in the spatial domain based on a cross power spectrum between the local map and the reference map in the spatial domain as described in connection with operations 610, 620 and 630. In some embodiments, the processing engine 122 may determine the target location of the subject in the reference map based on the X-Y offset between the local map and the reference map in the spatial domain, and the estimated pose data of the subject, as described in connection with operation 640. In 860, the processing engine 122 may determine a yaw (also referred to as an orientation) of the subject based on the reference pose data of the subject and a rotation angle between the local map and the reference map in the spatial domain as described in connection with operation 740.

Figure 9:
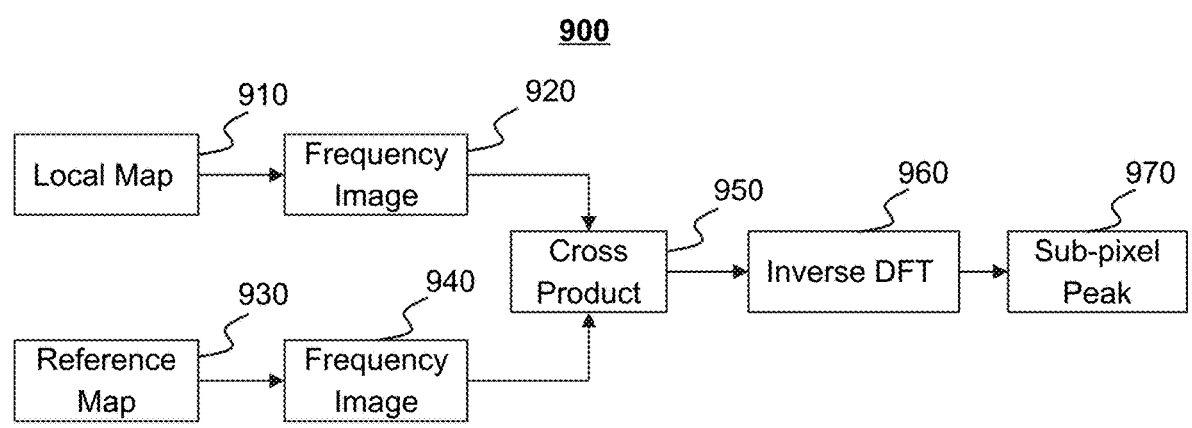
FIG. 9 is a schematic diagram illustrating an exemplary process for determining a target location of a subject according to some embodiments of the present disclosure.

FIG. 9 is a schematic diagram illustrating an exemplary process for determining a target location of a subject according to some embodiments of the present disclosure. In some embodiments, process 900 may illustrate the process for determining the target location of the subject (e.g., the vehicle 110) in combination with process 500 in FIG. 5, and process 600 in FIG. 6. As shown in FIG. 9, in 910, the processing engine 122 may generate a local map associated with estimated pose data of the subject in a spatial domain as described in connection with operation 520. In 920, the processing engine 122 may determine a frequency image corresponding to the local map by converting the local map in the spatial domain to a frequency domain as described in connection with operation 610. In 930, the processing engine 122 may obtain a reference map associated with the estimated pose data of the subject in the spatial domain as described in connection with operation 530. In 940, the processing engine 122 may determine a frequency image corresponding to the reference map by converting the reference map in the spatial domain to the frequency domain as described in connection with operation 610. In 950, the processing engine 122 may determine a cross product (i.e., a cross power spectrum) between the local map and the reference map in the frequency domain as described in connection with operation 610. In 960, the processing engine 122 may perform an inverse DFT on the cross product (i.e., the cross power spectrum) between the local map and the reference map in the frequency domain to determine the cross product between the local map and the reference map in the spatial domain as described in connection with operation 620. In 970, the processing engine 122 may determine a location (e.g., an X-value and a Y value) corresponding to a peak of the cross power spectrum in the spatial domain. The processing engine 122 may determine, based on the location corresponding to the peak of the cross power spectrum in the spatial domain, an offset between the local map and the reference map in the spatial domain. For example, the processing engine 122 may determine a sub-pixel peak of a function curve associated with the cross product between the local map and the reference map in the spatial domain as the offset between the local map and the reference map in the spatial domain as described in connection with operation 630. The processing engine 122 may determine the target location of the subject in the reference map based on the estimated location of the subject and the offset between the local map and the reference map in the spatial domain as described in connection with operation 640.

Figure 10:
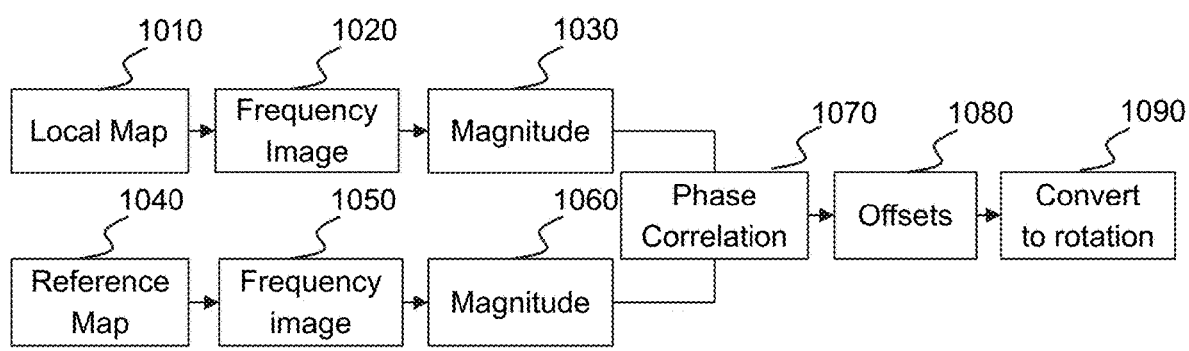
FIG. 10 is a schematic diagram illustrating an exemplary process for determining a target orientation of a subject according to some embodiments of the present disclosure.

FIG. 10 is a schematic diagram illustrating an exemplary process for determining a target orientation of a subject according to some embodiments of the present disclosure. In some embodiments, process 1000 may illustrate the process for determining the target orientation of the subject (e.g., the vehicle 110) in combination with process 500 in FIG. 5, and process 700 in FIG. 7. As shown in FIG. 10, in 1010, the processing engine 122 may generate a local map associated with estimated pose data of the subject in a spatial domain as described in connection with operation 520. In 1020, the processing engine 122 may determine a frequency image corresponding to the local map by converting the local map in the spatial domain to a frequency domain as described in connection with operations 710 and 720. In 1030, the processing engine 122 may determine a magnitude of the frequency image corresponding to the local map, as described in connection with operation 720.

In 1040, the processing engine 122 may obtain a reference map associated with the estimated pose data of the subject in the spatial domain as described in connection with operation 530. In 1050, the processing engine 122 may determine a frequency image corresponding to the reference map by converting the reference map in the spatial domain to the frequency domain as described in connection with operations 710 and 720. In 1060, the processing engine 122 may determine a magnitude of the frequency image corresponding to the reference map, as described in connection with operation 720. In some embodiments, the processing engine 122 may perform a polar transformation on the magnitude of the frequency image corresponding to the local map and the magnitude of the frequency image corresponding to the reference map, as described in connection with operation 720.

In 1070, the processing engine 122 may perform a phase correlation on the magnitude of the frequency image corresponding to the local map and the magnitude of the frequency image corresponding to the reference map, as described in connection with operation 730. In 1080, the processing engine 122 may determine an offset between the magnitude of the frequency image corresponding to the local map and the magnitude of the frequency image corresponding to the reference map in a polar coordinate system, based on the correlation between the magnitude of the frequency image corresponding to the local map and the magnitude of the frequency image corresponding to the reference map, as described in connection with operation 730.

In 1090, the processing engine 122 may determine a rotation angle between the local map and the reference map in the spatial domain based on the offset between the magnitude of the frequency image corresponding to the local map and the magnitude of the frequency image corresponding to the reference map in the polar coordinate system, as described in connection with operation 730. In some embodiments, the processing engine 122 may determine the rotation angle between the local map and the reference map in the spatial domain by performing an inverse polar transformation on the offset between the magnitude of the frequency image corresponding to the local map and the magnitude of the frequency image corresponding to the reference map in the polar coordinate system. The processing engine 122 may determine the target orientation of the subject in the reference map based on the reference orientation corresponding to the reference map and the rotation angle between the local map and the reference map in the spatial domain, as described in connection with operation 740.

FIGS. 11A, 11B, and 11C are schematic diagrams illustrating a phase correlation for a local map and a reference map according to some embodiments of the present disclosure. FIG. 11A shows a reference map with 200×200 size in a spatial domain presenting 20 meters×20 meters regions in a space. FIG. 11B shows a local map with a size of 200×200 in the spatial domain presenting 20 meters×20 meters regions in the space. The reference map and/or the local map in the spatial domain may be obtained as described in connection with operations 510 to 530 illustrated in FIG. 5. FIG. 11C shows a cross power spectrum between the reference map and the local map in the spatial domain. In some embodiments, the cross power spectrum between the reference map and the local map in the spatial domain shown in FIG. 11C may be obtained as described in connection with operations 610 and 620. As shown in FIG. 11C, the cross power spectrum between the reference map and the local map in the spatial domain may include a significant peak A. In some embodiments, a location corresponding to the peak A in the cross power spectrum may be determined as an offset between the reference map and the local map in the spatial domain, as described in connection with operations 630.

Figure 12A:
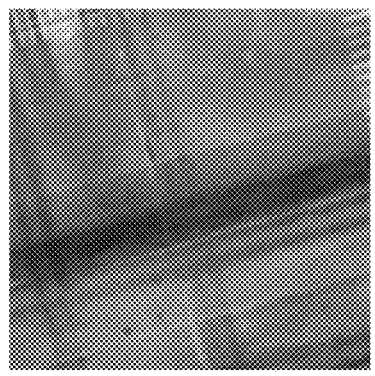
FIGS. 12A, 12B, and 12C are schematic diagrams illustrating a phase correlation for a local map and a reference map according to some embodiments of the present disclosure.
Figure 12B:
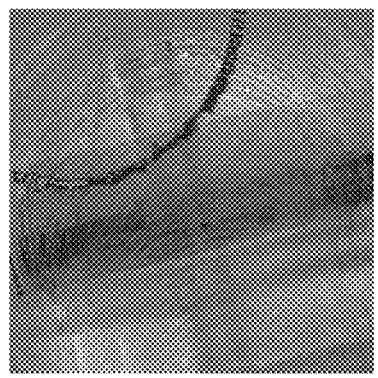
Figure 12C:
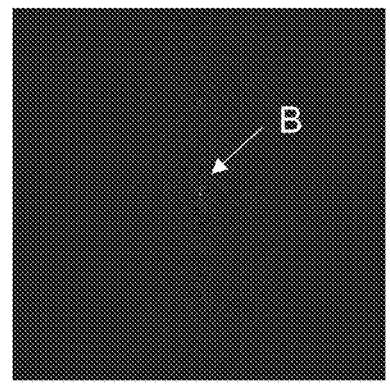

FIGS. 12A, 12B, and 12C are schematic diagrams illustrating a phase correlation for a local map and a reference map according to some embodiments of the present disclosure. FIG. 12A shows a reference map with 200×200 size in a spatial domain presenting 20 meters×20 meters regions in a space. FIG. 12B shows a local map with 200×200 size in the spatial domain presenting 20 meters×20 meters regions in the space. As shown in FIG. 12B, the local map may have a low texture with high noise. The reference map and/or the local map in the spatial domain may be obtained as described in connection with operations 510 to 530 illustrated in FIG. 5. FIG. 12C shows a cross power spectrum between the reference map and the local map in the spatial domain. In some embodiments, the cross power spectrum between the reference map and the local map in the spatial domain shown in FIG. 12C may be obtained as described in connection with operations 610 and 620. As shown in FIG. 12C, the cross power spectrum between the reference map and the local map in the spatial domain may also include a significant peak B. In some embodiments, a location corresponding to the peak B in the cross power spectrum may be determined as an offset between the reference map and the local map in the spatial domain, as described in connection with operations 630.

FIGS. 13A and 13B are schematic diagrams illustrating a polar transformation for an image according to some embodiments of the present disclosure. FIG. 13A shows an original image (e.g., a reference map, a local map) in a spatial domain. FIG. 13B shows a polar image corresponding to the original image. In some embodiments, the polar image shown in FIG. 13B may be determined by performing a polar transformation on the original image, as described in connection with operation 720.

FIGS. 14A-14E are schematic diagrams illustrating exemplary results of rotation angles between an original image and a plurality of images in a spatial domain according to some embodiments of the present disclosure.

Figure 14A:
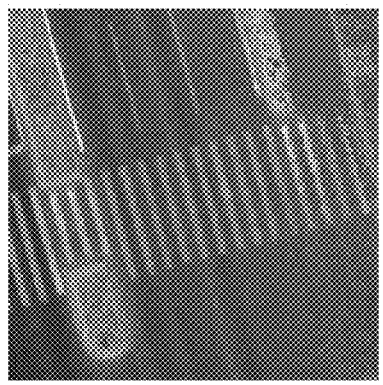
FIGS. 14A-14E are schematic diagrams illustrating exemplary results of rotation angles between an original image and a plurality of images in a spatial domain according to some embodiments of the present disclosure.
Figure 14B:
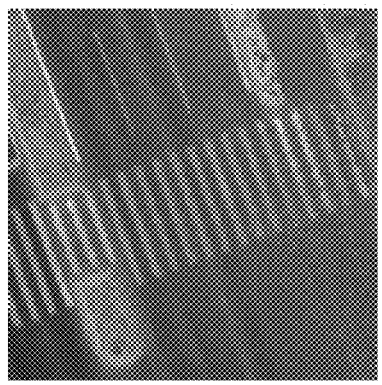
Figure 14C:
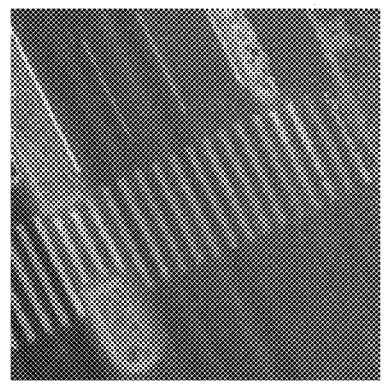
Figure 14D:
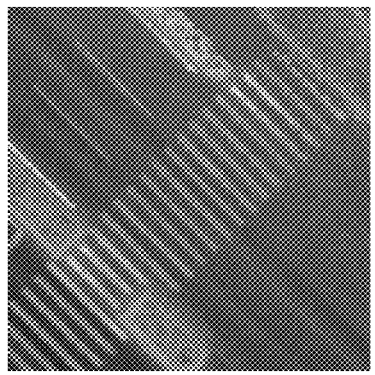
Figure 14E:
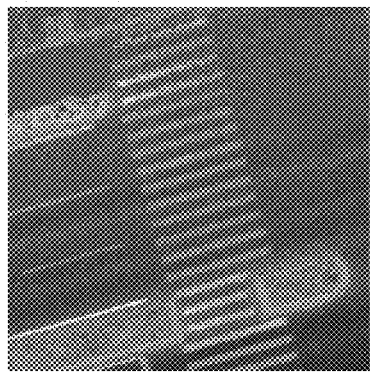

FIG. 14A shows an original image (e.g., a local map) in a spatial domain. FIG. 14B-14E show a plurality of images (e.g., reference maps) obtained by rotating the original image with a preset rotation angle of 5.0 degrees, 10.0 degrees, 30 degrees, and 90 degrees, respectively. The processing engine 122 may determine a rotation angle between the original image and each of the plurality of images (i.e., an image B, an image C, an image D, an image E) as described in connection with operations 710-740. The processing engine 122 may determine that the rotation angles between the original image and the image B, the image C, the image D, the image E are 5.16336 degrees, 10.2197 degrees, 30.504 degrees, and 89.9801 degrees, respectively.

FIGS. 15A-15C are schematic diagrams illustrating exemplary results of offsets and rotation angles between an original image and a plurality of images in the spatial domain according to some embodiments of the present disclosure.

FIG. 15A-15C show a plurality of images (e.g., reference maps) obtained by translating and rotating an original image (e.g., a local map) illustrated in FIG. 14A. A preset offset between the original image and an image F is (5, 5), and a preset rotation angle between the original image and the image F is 5.0 degrees, as shown in FIG. 15A. A preset offset between the original image and an image G is (5, 5), and a preset rotation angle between the original image and the image G is 15.0 degrees, as shown in FIG. 15B. A preset offset between the original image and an image H is (5, 5), and a preset rotation angle between the original image and the image H is 45.0 degrees, as shown in FIG. 15C.

The processing engine 122 may determine an offset between the original image and each of the plurality of images (i.e., the image F, the image G, the image H) as described in connection with operations 610-640. Accordingly, the processing engine 122 may determine that the offsets between the original image and the image F, the image G, and the image H are (4.95259, 4.9668), (4.81576, 4.82327), and (4.9156, 4.88809), respectively.

The processing engine 122 may determine a rotation angle between the original image and each of the plurality of images (i.e., the image F, the image G, the image H) as described in connection with operations 710-740. Accordingly, the processing engine 122 may determine that the rotation angles between the original image and the image F, the image G, the image H are 5.22457 degrees, 15.6433 degrees, and 45.5852 degrees, respectively.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for positioning, comprising:
at least one non-transitory storage medium storing a set of instructions; and
at least one processor in communication with the at least one storage medium, when executing the stored set of instructions, the at least one processor causes the system to:
obtain estimated pose data of a subject;
generate a local map associated with the estimated pose data;
obtain, based on the estimated pose data, a reference map;
determine a cross power spectrum between the local map and the reference map in a frequency domain;
convert the cross power spectrum between the local map and the reference map in the frequency domain to a spatial domain;
determine, based on the cross power spectrum between the local map and the reference map in the spatial domain, an offset between the local map and the reference map; and
determine, based on the estimated pose data and the offset, target pose data of the subject to navigate the subject.

2. The system of claim 1, wherein the estimated pose data includes at least one of an estimated location or an estimated orientation, and the target pose data of the subject includes at least one of a target location or a target orientation.

3. The system of claim 2, wherein to determine, based on the estimated pose data and the offset, target pose data of the subject to navigate the subject, the at least one processor is configured to cause the system to:
determine, based on the estimated location of the subject and the offset between the local map and the reference map, the target location in the reference map.

4. The system of claim 2, wherein the at least one processor is configured to cause the system to:
determine, based on a correlation between the local map and the reference map in the frequency domain, a rotation angle between the local map and the reference map; and
determine, based on the rotation angle between the local map and the reference map, the target orientation in the reference map.

5. The system of claim 4, wherein the at least one processor is configured to cause the system to:
determine a geometric transformation relationship between the local map and the reference map in the frequency domain; and
determine, based on the geometric transformation relationship between the local map and the reference map in the frequency domain, the rotation angle between the local map and the reference map.

6. The system of claim 5, wherein the at least one processor is configured to cause the system to:

perform a polar transformation on the local map and the reference map.

7. The system of claim 1, wherein to determine, based on the cross power spectrum between the local map and the reference map in the spatial domain, the offset between the local map and the reference map, the at least one processor is configured to cause the system to:
determine a location corresponding to a peak of the cross power spectrum between the local map and the reference map in the spatial domain;
determine, based on the location corresponding to the peak of the cross power spectrum between the local map and the reference map in the spatial domain, the offset between the local map and the reference map.

8. The system of claim 7, wherein the at least one processor is configured to cause the system to:
determine a fitting curve by performing an interpolation operation on the cross power spectrum between the local map and the reference map in the spatial domain;
designate a location corresponding to a peak of the fitting curve as the offset between the local map and the reference map.

9. The system of claim 1, wherein the local map includes at least one of an intensity image or an elevation image.

10. The system of claim 1, wherein the reference map includes at least one of an intensity image or an elevation image.

11. A method for positioning, comprising:
obtaining estimated pose data of a subject;
generating a local map associated with the estimated pose data;
obtaining, based on the estimated pose data, a reference map;
determining a cross power spectrum between the local map and the reference map in a frequency domain;
converting the cross power spectrum between the local map and the reference map in the frequency domain to a spatial domain;
determining, based on the cross power spectrum between the local map and the reference map in the spatial domain, an offset between the local map and the reference map; and
determining, based on the estimated pose data and the offset, target pose data of the subject to navigate the subject.

12. The method of claim 11, wherein the estimated pose data includes at least one of an estimated location or an estimated orientation, and the target pose data of the subject includes at least one of a target location or a target orientation.

13. The method of claim 12, wherein determining, based on the estimated pose data and the offset, target pose data of the subject to navigate the subject, comprises:
determining, based on the estimated location of the subject and the offset between the local map and the reference map, the target location in the reference map.

14. The method of claim 13, further comprises:
determining, based on a correlation between the local map and the reference map in the frequency domain, a rotation angle between the local map and the reference map; and determining, based on a reference orientation corresponding to the reference map and the rotation angle between the local map and the reference map, the target orientation in the reference map.

15. The method of claim 14, wherein determining, based on the correlation between the local map and the reference map in the frequency domain, a rotation angle between the local map and the reference map, comprises:
determining a geometric transformation relationship between the local map and the reference map in the frequency domain;
determining, based on the geometric transformation relationship between the local map and the reference map in the frequency domain, the rotation angle between the local map and the reference map.

16. The method of claim 15, further comprises:
performing a polar transformation on the local map and the reference map.

17. The method of claim 11, wherein determining, based on the cross power spectrum between the local map and the reference map in the spatial domain, the offset between the local map and the reference map, comprises:
determining a location corresponding to a peak of the cross power spectrum between the local map and the reference map in the spatial domain; and
determining, based on the location corresponding to the peak of the cross power spectrum between the local map and the reference map in the spatial domain, the offset between the local map and the reference map.

18. The method of claim 17, further comprises:
determining a fitting curve by performing an interpolation operation on the cross power spectrum between the local map and the reference map in the spatial domain; and
designating a location corresponding to a peak of the fitting curve as the offset between the local map and the reference map.

19. The method of claim 11, wherein the local map includes at least one of an intensity image or an elevation image.

20. A non-transitory computer readable medium storing instructions, the instructions, when executed by at least one processor, causing the at least one processor to implement a method comprising:
obtaining estimated pose data of a subject;
generating a local map associated with the estimated pose data;
obtaining, based on the estimated pose data, a reference map;
determining a cross power spectrum between the local map and the reference map in a frequency domain;
converting the cross power spectrum between the local map and the reference map in the frequency domain to a spatial domain;
determining, based on the cross power spectrum between the local map and the reference map in the spatial domain, an offset between the local map and the reference map; and
determining, based on the estimated pose data and the offset, target pose data of the subject to navigate the subject.

* * * * *